United States Patent [19]

Rattlingourd

[11] 4,280,099
[45] Jul. 21, 1981

[54] DIGITAL TIMING RECOVERY SYSTEM

[75] Inventor: Glen D. Rattlingourd, Salt Lake City, Utah

[73] Assignee: Sperry Corporation, New York, N.Y.

[21] Appl. No.: 92,765

[22] Filed: Nov. 9, 1979

[51] Int. Cl.³ .......................... H03K 5/26; H03L 7/00
[52] U.S. Cl. ...................................... 328/63; 328/61;
    328/155; 375/119; 307/269
[58] Field of Search ...................... 328/63, 72, 73, 61,
    328/155; 375/110, 118, 119; 307/269, 208

[56] References Cited
U.S. PATENT DOCUMENTS

| 3,544,717 | 12/1970 | Smith | 375/118 |
| 3,585,298 | 6/1971 | Liberman | 375/119 |
| 3,593,160 | 7/1971 | Moore | 328/63 |
| 3,671,776 | 6/1972 | Houston | 307/269 |
| 3,745,248 | 7/1973 | Gibson | 375/110 |
| 3,820,030 | 6/1974 | Williams | 328/63 |
| 3,894,246 | 7/1975 | Torgrim | 307/208 |
| 4,105,979 | 8/1978 | Kage | 328/63 X |
| 4,163,946 | 8/1979 | Alberts | 328/63 |

Primary Examiner—John S. Heyman
Attorney, Agent, or Firm—Thorpe, North, Western & Gold

[57] ABSTRACT

An improved method of recovering a clock reference signal from digital data and maintaining small phase errors between the two. The clock reference signal is phase matched with the digital data by comparing the positive going and negative going edges of the data with the clocking edge of the clock signal. A hard decision is made on the relative phase of the clock signal and the data only after several edge transitions occur. After a finite number of samples of these transitions, a decision is made whether to advance or retard the clock signal by observing whether the majority of the data transitions over the sample period occurred prior to or after the clocking edge of the clock signal. This allows a sampled mean to be established and thereby a more accurate prediction of the relative phase between the clock signal and data to be made. In addition, a fast acquisition technique is provided to insure the clock reference signal is received in a minimum amount of time.

13 Claims, 5 Drawing Figures

DIGITAL TIMING RECOVERY SYSTEM

BACKGROUND OF THE INVENTION

This invention relates to a system for recovering a clock signal synchronized with received digital data, and more particularly to a digital timing recovery system for recovering a clock signal synchronized with received non-return-to-zero (NRZ) data.

A common format for transmitting digital data is the so-called non-return-to-zero (NRZ) format, in which one data bit is separated from an adjacent data bit only by a time relationship as defined by a master clock. Thus, a series of zeros would appear as a continuous low signal, whereas a series of ones would appear as a continuous high signal. Only when there is a data transition—i.e., a change from a zero to a one, or a one to a zero—is the boundary between one data bit an an adjacent data bit apparent.

When such a data stream is presented to a receiver, it is necessary to recover or produce a clock signal that is synchronized with the data transitions in order to properly interpret the data. The classical technique for recovering a clock signal synchronized with an input stream of digital data, especially NRZ data, is by use of an analog phase-locked loop. Analog phase-locked loop circuitry, which is well known in the art, typically comprises a phase detector to compare the phase of the received digital data with that of a clock signal; a low pass filter to convert an error signal from the phase detector to an error voltage; and a voltage controlled oscillator (VCO) having an output frequency that is controlled by the error voltage generated by the low pass filter.

Numerous problems are associated with the design, use, and manufacture of analog phase-locked loop circuits. For example, the VCO may be an extremely complex circuit, and the number of components that must be handled to fabricate a phase-locked loop circuit on a printed circuit board can significantly increase manufacturing costs. Moreover, analog phase-locked loop circuits have problems associated with the stability of the oscillator, resulting in undesirable "jitter" appearing in the output clock signal. Design techniques aimed at reducing clock jitter, however, create an oscillator with very limited lock range, meaning the phase-locked loop is only capable of locking onto data within a very narrow frequency spectrum. Also, component or voltage supply variations due to aging and temperature changes may contribute to the stability problems by creating drift in the oscillator frequency and error voltage.

Digital phase-locked loops have also been employed in the prior art. For example, Malek, U.S. Pat. No. 3,983,498 (1976), discloses an oscillator, programmable frequency divider, phase detector, and data transition detector. The transition detector is used to generate a pulse of defined width at each data transition. The oscillator is used to generate a fixed frequency signal, which frequency is then divided by a programmable frequency divider down to the desired clock frequency. To synchronize the phase of the clock signal with the data transitions, the phase of the data is compared with the phase of the oscillator in the phase detector, and depending upon whether the clock phase leads or lags the data phase, the divisor of the programmable divider is adjusted so as to advance or retard the clock phase to synchronize it with the data transitions.

The problems with digital phase-lock loops of the type disclosed in Malek are that the adjustments to the clock phase are made at every data transition. This tends to cause excessive jitter in the clock output signal. Moreover, the divisor of the programmable frequency divider is always changed by the same amount, thereby defining a fixed rate at which the clock signal may be brought into phase with the data transitions regardless of the amount of phase error that exists when the signals are first compared. Hence, a long access time results.

SUMMARY OF THE INVENTION

A principle object of the present invention is to provide an improved digital timing recovery system that recovers a clock signal in synchronization with received digital data with minimum phase jitter, improved lock range, and minimum access time.

A further object of the present invention is to provide a digital timing recovery system that does not exhibit the instability, drift, and temperature problems associated with prior art phase-locked loop circuits.

A still further object of the present invention is to provide a digital timing recovery system that is readily and relatively inexpensively manufactured.

A still additional object of the present invention is to provide a digital timing recovery system that quantifies the amount of phase error between the received digital data and the clock signal.

Another object of the present invention is to provide a digital timing recovery system that efficiently minimizes the measured phase error so as to reduce access time when a large phase error is present.

A still further object of the present invention is to provide such a system wherein small phase error corrections are made only after integrating the phase error over several clock cycles, thereby reducing clock jitter.

The above and other objects of the present invention are realized in a digital timing recovery system that processes the received digital data stream and produces a clock signal in synchronization therewith. Received digital data is processed by a transition detector that generates a pulse at each data transition. An oscillator produces a fixed frequency signal of frequency f. This fixed frequency signal is divided by a variable divider circuit to produce a clock signal that has a frequency of f/m, where m is an integral divisor, more completely expressed as $m = n \pm i$, where $i = 0, 1, 2, \ldots$, and n is a fixed base integer.

The phase between the f/m clock signal and the data transition pulses is measured in a window counter that determines if the data transition occurs within a defined window of time measured from a clocking transition or edge of the clock signal. If not—i.e., if there is a large phase error—then the integral divisor m is made larger or smaller, depending upon whether the data transitions lead or lag the clock transition. This change is made in large steps. The resulting clock frequency, and the corresponding phase of the clock signal, are thus shifted in large steps. This adjustment is made at each data transition until the clock phase is either advanced or retarded sufficiently to make the phase error between the clocking transition and the data transition less than the window time defined by the window counter.

Once a data transition occurs within this prescribed window of time—i.e., once the phase error is small—then this small phase error is integrated over a preselected time period that lasts for several clock cycles. During this integrating period, the clock frequency is set to its nominal design value, f/n (that is, i is set equal to zero). At the end of this integration period, the clock phase is either advanced or retarded in a small increment by making a small change in the clock frequency. This small frequency adjustment is made on a one time basis at the end of the integration period. Once made, a new integration period begins over which the phase error is again measured while the clock frequency is set to its design value, f/n. In this fashion, the clock signal is kept in synchronization with the received digital data, yet the resulting jitter of the clock signal is significantly reduced.

BRIEF DESCRIPTION OF THE DRAWINGS

The above and other objects, features, and advantages of the invention will be more apparent from the following more particular description presented in connection with the accompanying drawings, in which.

DETAILED DESCRIPTION OF THE PREFERRED EMBODIMENT

Figure 1:
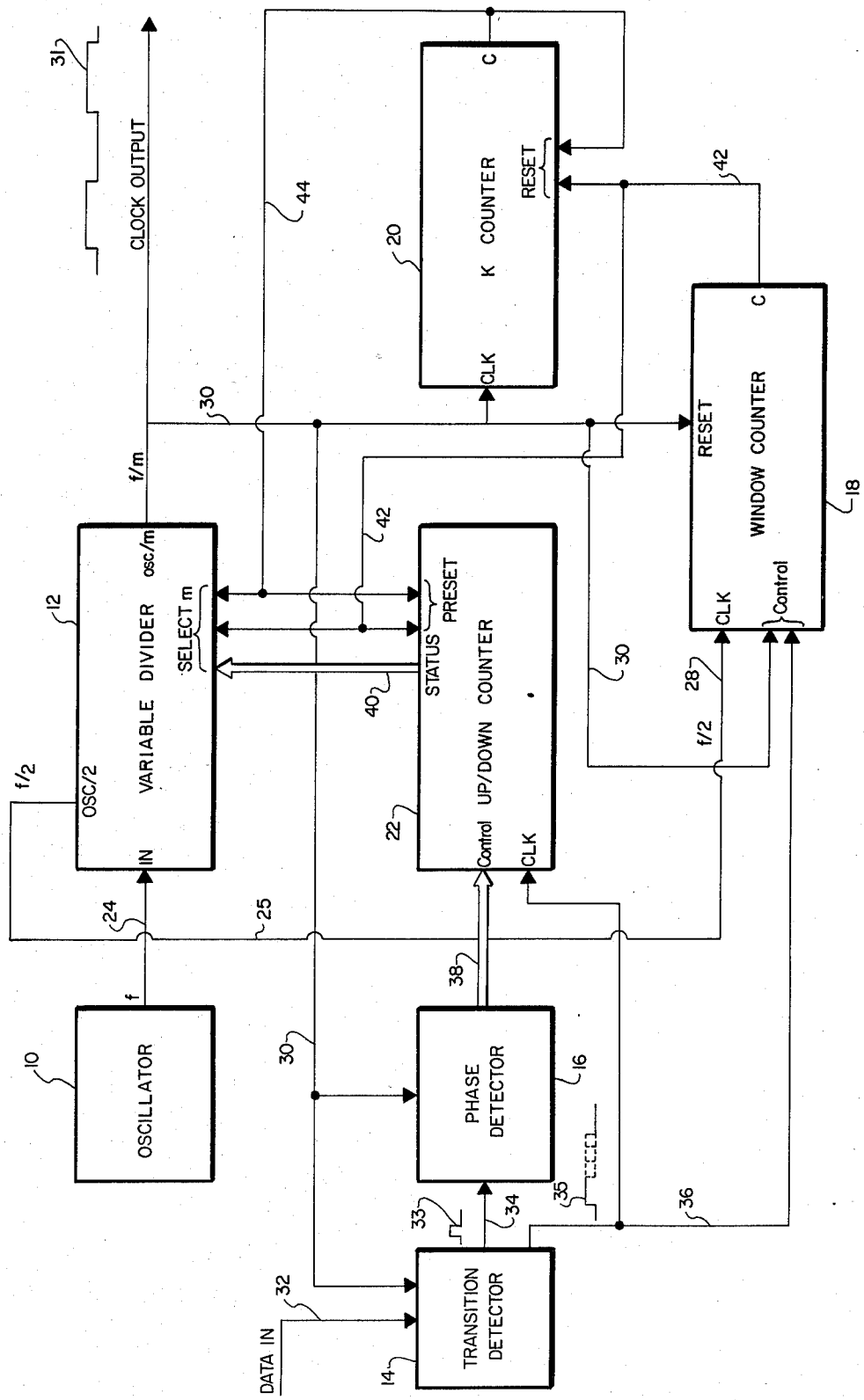
FIG. 1 is a block diagram of the improved Digital Timing Recovery System that is the subject of the present invention.

In FIG. 1, there is shown a block diagram of the Digital Timing Recovery System. Digital data is received in an input data stream over signal line 32 and is directed to a transition detector 14. The transition detector 14 senses data transitions (positive going or negative going) that occur in the received digital data and generates two output pulse signals that begin coincident with the data transitions. The first is a data transition pulse 33 that is sent to a phase detector 16 over signal line 34. This transition pulse 33 is of a defined duration, typically being very narrow compared to the nominal data rate of the received digital data. The second output pulse signal is a data transition control pulse 35 that is sent over signal line 36 as a clock signal to an up/down Counter 22 and as a control signal to a window counter 18. This control pulse 35 is of a variable width, beginning at a data transition and terminating at the next transition of the clock output signal.

The clock output signal 31 is derived from an oscillator 10 that generates a fixed frequency signal of frequency f. This fixed frequency signal is directed over signal line 24 to a variable divider 12 where it is divided by a variable divisor m. Thus, the clock output signal 31 has a frequency f/m. Typically, m is a relatively large number, on the order of 200, but the invention herein disclosed contemplates that m could be almost any numerical value. Alternatively, the invention contemplates that m could be a fraction, in which case the clock output signal would have a frequency greater than f.

The clock output signal 31 is used throughout the Digital Timing Recovery System. Functionally, it is routed to its various destinations over signal line 30. However, although line 30 is shown in FIG. 1 as a single line, it is to be understood that it may be several lines, and the clock signals thereon may be any signal that contains timing information associated with the transitions of the clock output signal 31.

The variable divider 12, in addition to outputting the clock signal 31, also outputs a clock signal to the window counter 18 over signal line 25. This window clock signal has a frequency that is illustratively one half of the fixed frequency signal of the oscillator 10, this giving it a frequency of f/2. However, because the primary function of the window counter 18 (as will be explained below) is to generate a fixed time reference by counting a given number of clock cycles, almost any fixed frequency signal could be used for this purpose that would generate a desired time reference in a window counter of a given size.

The window counter 18 is used to measure the time between a data transition and a clocking edge of the clock output signal 31. The clocking edge of the clock signal 31 may be either the positive going edge or the negative going edge depending upon the particular logic design that is employed. In the preferred embodiment herein disclosed, the positive going edge is the "clocking transition" or "edge" to which reference is made. The time between a data transition and the clocking edge is conceptually measured by: (1) resetting the window counter 18 to a predetermined value at the non-clocking edge of the clock signal 31; (2) enabling the window counter 18 (that is, allowing the f/2 clock signal to begin counting up from the reset value) at the data transition control pulse 35 or the clocking edge of the clock signal 31, whichever occurs first; and (3) disabling the window counter 18 (that is, preventing the f/2 clock signal from any further counting) at the data transition control pulse or the clocking edge of the clock signal 31, whichever occurs last. If the window counter 18 reaches its terminal count (that is, if it reaches a predetermined count, which count may be the maximum count it is capable of holding) before it has been disabled, then it outputs an out-of-window timing pulse on signal line 42. If it does not reach its terminal count before being disabled, then no out-of-window timing pulse appears on line 42. In either event, the window counter 18 is always reset to its reset value at the non-clocking edge of the clock signal 31. In the preferred embodiment, this reset value is selected to be zero, although it could readily be programmed to be any other suitable value.

As is apparent from the above description, the presence of an out-of-window timing pulse on signal line 42 indicates that the time difference between a clocking edge and a data transition exceeds the fixed time reference defined by the window counter 18. Hereinafter, this is referred to as an out-of-window condition and is indicative, as mentioned, of the existance of a large phase error. Correspondingly, if an out-of-window timing pulse is not generated, then an "in-window" condition exists which is indicative of a small phase error.

The invention includes the option of using the window counter 18 as a more precise measure of the phase error between a data transition and a clocking edge. That is, rather than using the window counter to merely indicate an out-of-window or in-window condition, it could be expanded and used to give a more detailed time measure of the phase error. Such a detailed measure could be readily accomplished by reading the count contained in the window counter at the time it is disabled. Because each count can be assigned a defined unit of time (as set by the frequency of the window clock signal), a more precise measure of the phase error could thus be obtained directly from this count.

The window counter 18 is designed to indicate an out-of-window or in-window condition regardless of whether the data transition leads or lags the clocking edge. The phase detector 16, on the other hand, compares the data transition pulse 33 with the clock output signal 31 to determine which occurs first—a data transition or a clocking transition. If a data transition occurs before a clocking edge, then the object of the invention is to advance subsequent clocking edges in time so that they will occur sooner, and therefore closer to the time of subsequent data transitions. Similarly, if a data transition occurs after a clocking edge, then subsequent clocking edges are retarded in time so that they will occur closer to the time of subsequent data transitions.

The method used by the invention to advance or retard clocking edges is to momentarily increase or decrease the frequency of the clock output signal 31. This change in frequency is realized by changing the value of the divisor m employed by the variable divider 12. Thus, if it is desired to advance the clocking edge, then the frequency of the clock output signal 31 is increased by decreasing the value of m. Contrariwise, if it is desired to retard subsequent clocking edges, then the frequency of the clock output signal 31 is decreased by increasing the value of m.

It is noteworthy to recognize that the received digital data (received on line 32) was originally generated by a master clock at a fixed data rate. Except for slight variations that may occur to this fixed data rate during transmission (such as doppler frequency shifts, or—where the data is recorded—a different playback rate), which variations are generally predictable, the data rate of the digital data received over line 34 will be the same as, or a predictable ratio of, the fixed data rate of the original master clock. Accordingly the fixed frequency f of the oscillator 10, and the nominal value of the integral divisor m, are selected so that the resulting frequency of the clock output signal 31, f/m, is the same as, or a desired ratio of, the original fixed data rate. Thus, as the clocking edge of the clock output 31 is advanced or retarded by varying the value of m, m must be returned to its nominal value as soon as the desired phase shift has been accomplished.

It is therefore convenient to conceptualize m as being composed of two parts: (1) a fixed base integer n, and (2) a variable integer i. The value of m can thus be expressed as $m = n \pm i$, where $i = 0, 1, 2, 3, \ldots$. When it is not necessary to shift the phase of the clock output signal 31, i is selected to be zero, and n is chosen so that the resulting f/n frequency of the clock output signal 31 is equal to the original fixed data rate, or a desired ratio thereof. When the phase of the clock output 31 needs to be advanced or retarded a small amount, then i is selected to be one. When the phase needs to be advanced or retarded a larger amount, then i is selected to be a suitable value greater than one. The selected value of i is then added or subtracted to the value of n, resulting in a clock output frequency that is $f/(n \pm i)$.

In the preferred embodiment of the invention, n is selected to be 200 and i is selected to be: "0" if no phase correction is desired, "1" if an in-window condition exists, and "2" if an out-of-window condition exists. Thus, if an out-of-window condition exists, the value of m is updated to $m = 200 \pm 2$ (198 or 202). This updating continues with each data transition until an in-window condition exists. Once an in-window condition exists, then m is updated to $m = 200 \pm 1$ (199 or 201) only after a predefined integration time period, $T_I$, has expired. During this period $T_I$, m is maintained at its nominal value ($m = n \pm 0 = 200$) while the up/down counter 22 integrates or accumulates the in-window phase errors associated with each data transition, as explained below.

At the beginning of the integration period $T_I$, the up/down counter 22 is preset to a mid-range value, mid-range meaning about halfway between its maximum and minimum capacity. During this $T_I$ period, the up/down counter 22 is incremented once every time a data transition leads a clocking edge, and decremented once every time a data transition lags a clocking edge. Control signals that steer the up/down counter 22 to count up or down in this fashion are received from the phase detector 16 over data bus 38. The actual clocking of the up/down counter occurs at the leading edge of the control pulse 35, which pulse is sent to the up/down counter over signal line 36.

At the end of the integration period $T_I$, the up/down counter 22 thus contains a count therein that indicates whether the data transitions which occurred during $T_I$ have predominatly led or lagged the clocking edge. If more data transitions have led than have lagged, then the up/down counter 22 will have a count therein that is greater than its pre-set mid-range value. On the other hand, if more data transitions have lagged than led the clocking edge, then the window counter 22 will have a count therein that is less than its pre-set mid-range value. Hence, by reading this "count" contained in the up/down counter 22 at the end of the $T_I$ integration period, which "count" is hereinafter referred to as the "status" of the up/down counter, a decision can be made as to whether the value of m should be increased or decreased, thereby making an appropriate correction in the clock phase. As shown in FIG. 1, the up/down counter's status is made available to the variable divider 12 over data bus 40 for this purpose. While data bus 40 is functionally illustrated as a bus comprising a plurality of signal lines, it is to be understood that it may comprise a single line.

The length of the integration period $T_I$ is determined by a K-counter 20. This counter is adapted to count k cycles of the clock output signal 31 before issuing a terminal count pulse on line 44, where k is an integer. This terminal count pulse is used to: (1) reset the K-counter 20 back to its reset value (typically zero), thus allowing a new integration period to begin; (2) preset the up/down counter 22 back to its mid-range value; and (3) allow the variable divider 12 to update the value of m comensurate with the status of the up/down counter 22.

As shown in FIG. 1, the out-of-window timing pulse appearing on signal line 42 is also used to reset the K-counter 20 and to preset the up/down counter 22 back to its mid-range value. Moreover, this pulse signals the variable divider 12 that a large phase error is present and that an appropriate value of m must be correspondingly selected. Thus, the K-counter is effectively disabled as long as an out-of-window condition exists because it is continually being reset.

The up/down counter 22 is also partially disabled by an out-of-window condition in that the up/down counter 22 can never count up or count down more than one count before being preset back to its mid-range value by the out-of-window timing pulse. However, that one count is important inasmuch as it changes the up/down counter's status enough so that the variable divider 12 knows whether to increase or decrease the value of m to correct for the out-of-window (large phase error) condition.

The use of the window counter 18 to sense large phase errors that are quickly acted upon (at each data transition), and the use of the up/down counter 22 and the K-counter 20 to define an integration period over which smaller phase errors are integrated before a clock phase correction is initiated, are significant improvements over the prior art relating to digital timing recovery systems. Without the window counter 18, the access time of the system would be greatly impaired. Using the window counter, on the other hand, allows large phase errors to be immediately sensed and corrected.

Similarly, without the K-counter 20 to define an integration period over which the up/down counter 22 may integrate the lag or lead phase errors, it would be necessary to make a decision at each data transition as to whether the clock phase should be advanced, retarded, or left as is. Because a small phase error is likely to exist at most data transitions, this could result in advancing the clock phase at one data transition, retarding it at the next, and so on, thus producing undesirable jitter in the clock output signal. Thus, the advantage of using an up/down counter 22 in connection with a K-counter 20 is that a clock output signal is produced that has significantly reduced jitter.

Figure 2:
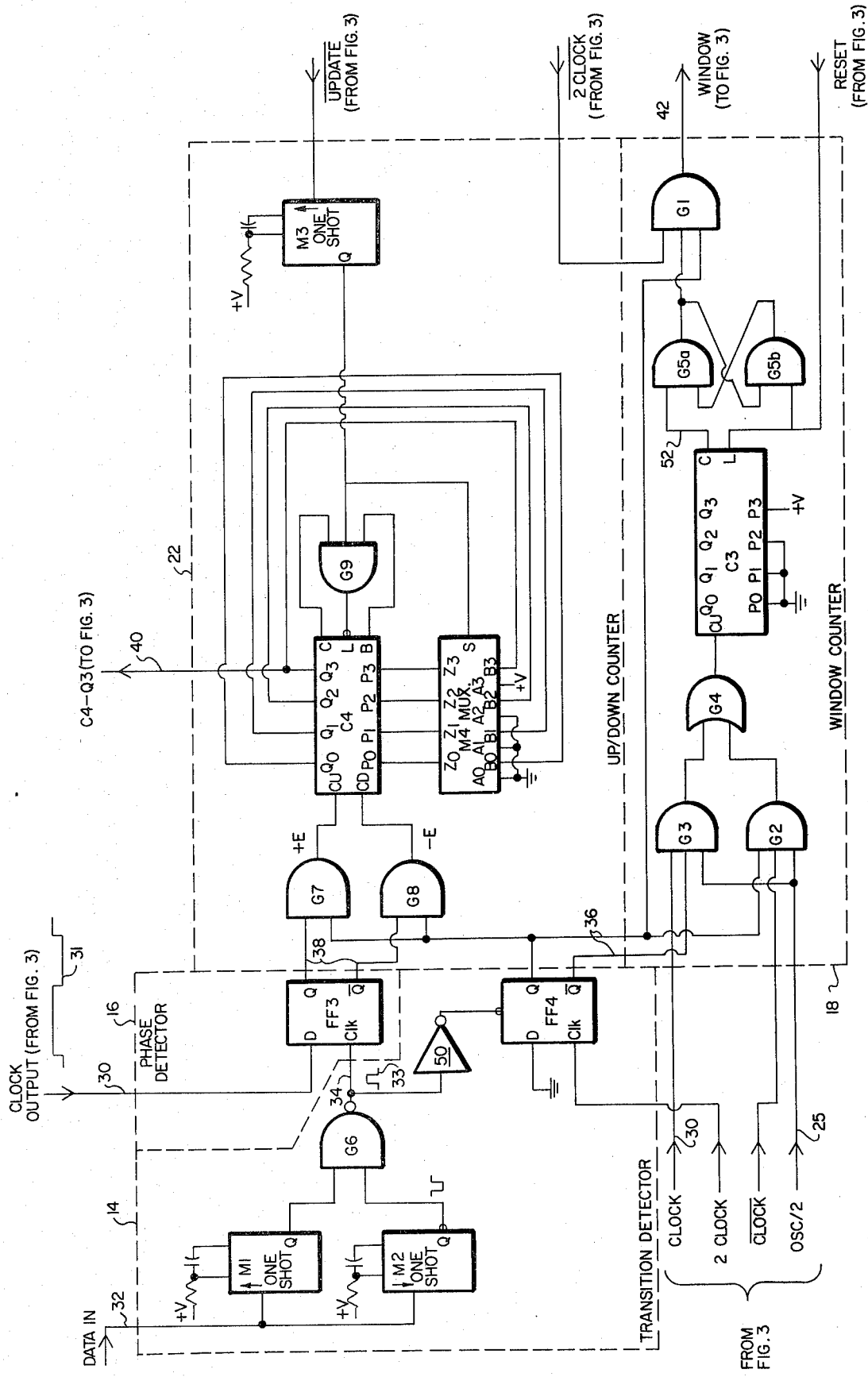
FIG. 2 is a detailed logic schematic diagram of the preferred embodiment of the phase detector, transition detector, up/down counter and window counter shown in FIG. 1.
Figure 3:
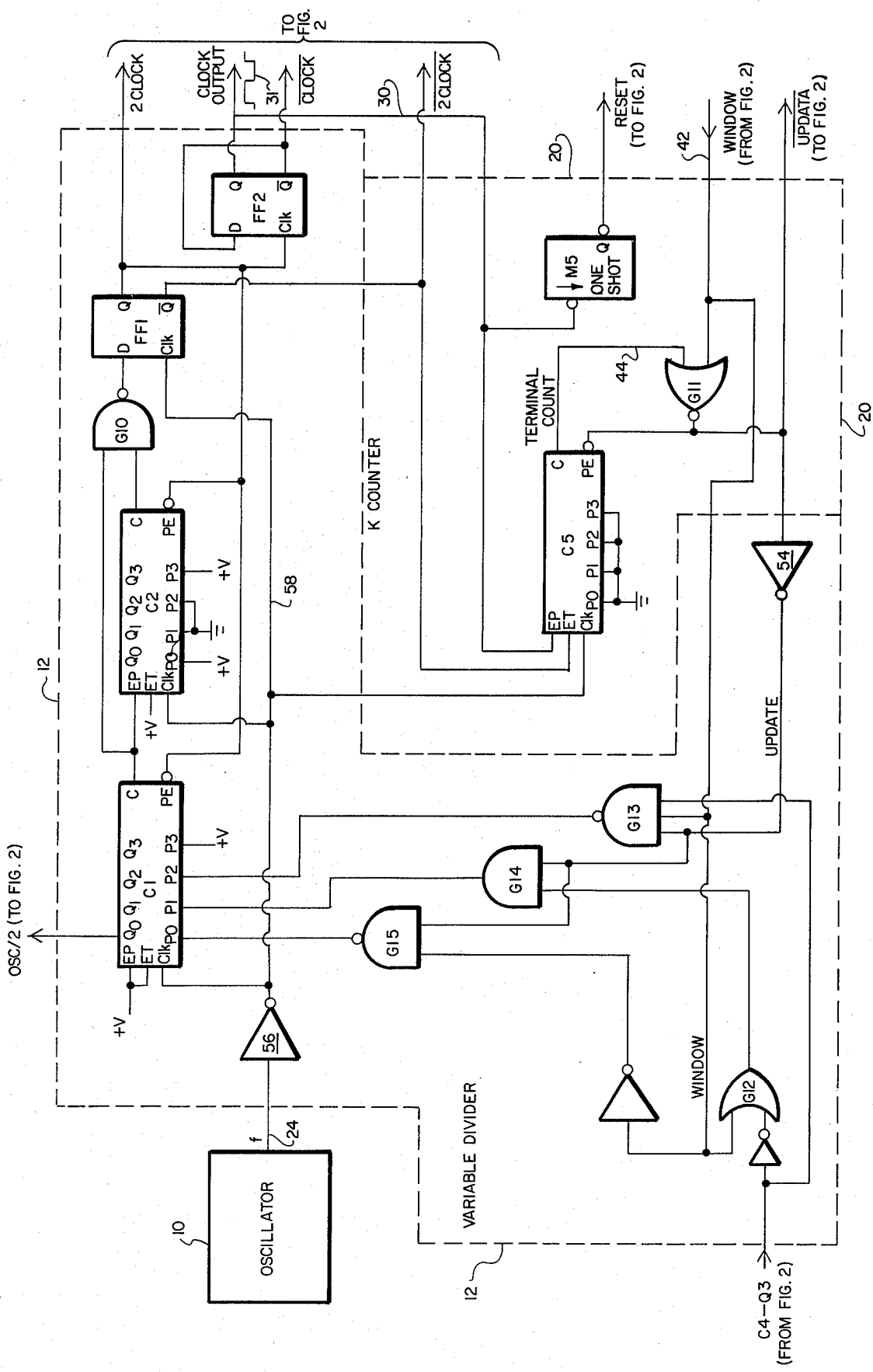
FIG. 3 is a detailed logic schematic diagram of the preferred embodiment of the variable divider and K-counter shown in FIG. 1.
Figure 5:
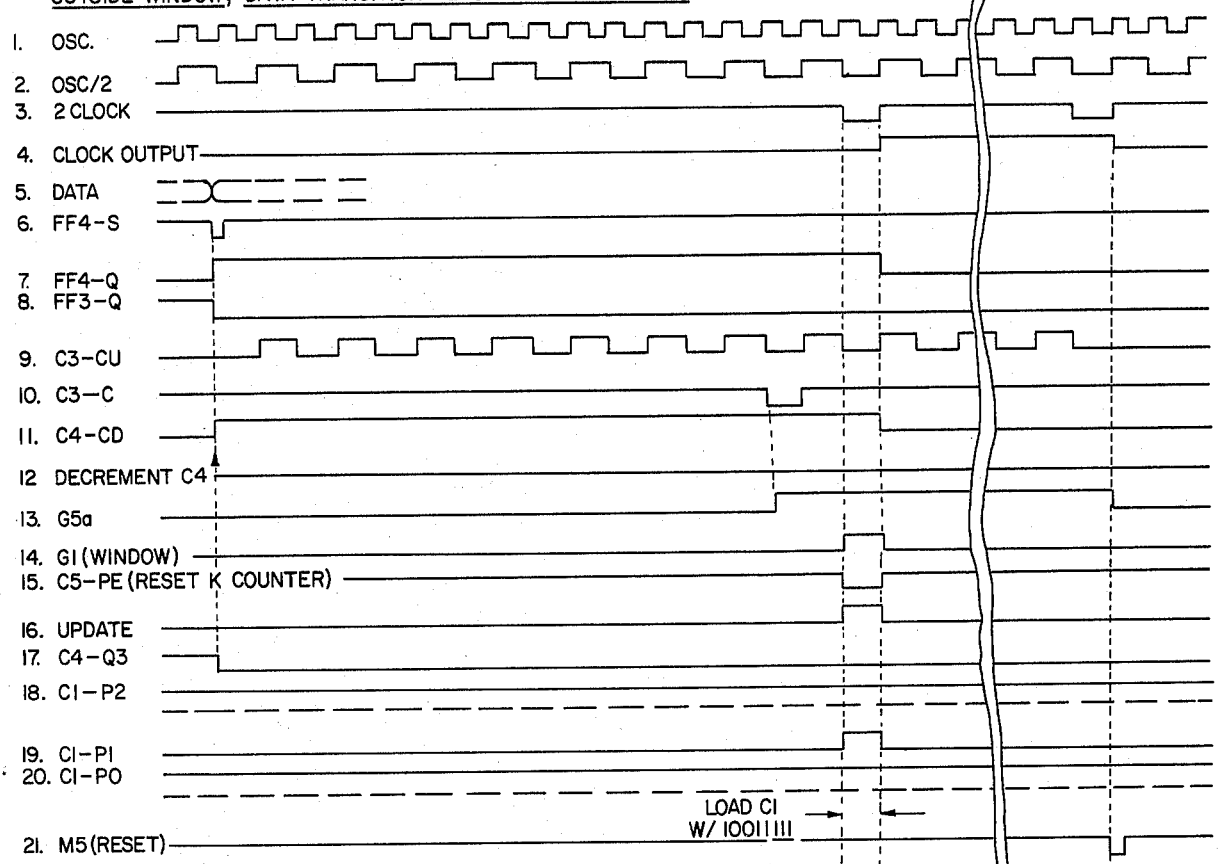
FIG. 5 is a detailed timing diagram that illustrates the timing sequence of selected key signals associated with the operation of the circuitry shown in FIGS. 2 & 3 when a data transition occurs before the clock signal.
Figure 5:
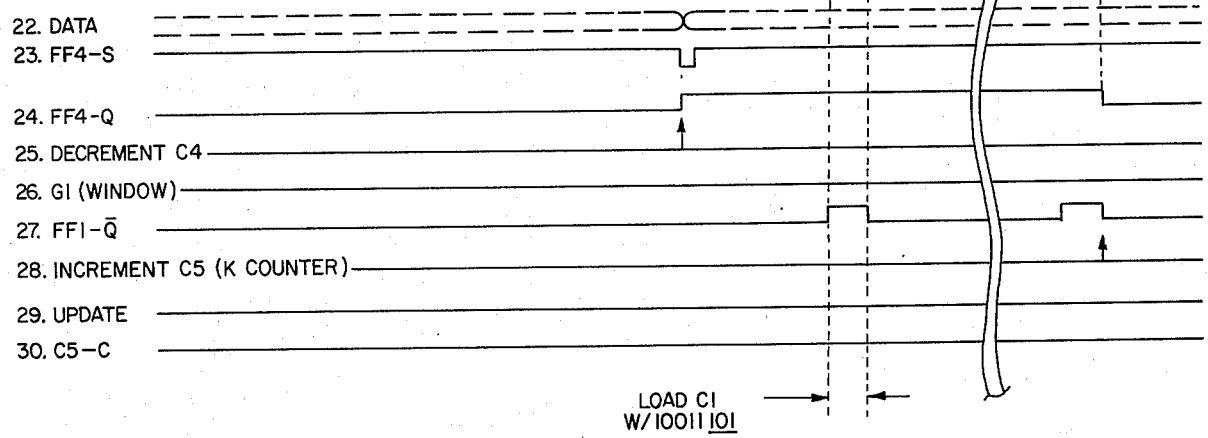

With an understanding of the above described concepts and principles, one skilled in the art of digital circuitry and design would be able to readily practice the invention using commercially available components. An exemplary embodiment of the invention is shown in FIGS. 2 and 3, and timing sequence diagrams corresponding to the operation of this exemplary embodiment are shown in FIGS. 5 and 6. These figures will be self-explanatory to those skilled in the art. Nonetheless, the following brief description of the figures is presented to more fully disclose what is considered as the best mode of the invention.

In FIG. 2, it is seen that the transition detector 14 includes two monostable multivibrator circuits, or "one shots," M1 and M2, connected in parallel to the received data input line 32. M1 is designed to be triggered by a positive data transition and M2 is designed to be triggered by a negative data transition. Both are configured to generate a narrow pulse when triggered by the appropriate data transition. These pulses are combined in a logic NAND gate G6, the output of which comprises the data transition pulse 33 referred to previously in connection with FIG. 1. This pulse is sent to the phase detector 16 over signal line 34. The M1 and M2 "one shots," as with all the gates, flip-flops, counters, and other elements used in the preferred embodiment, may be realized with commercially available components. For example, if transistor transistor logic (TTL) components are used, a suitable commercial one shot is the generically numbered 54121, or the dual one shot 54123, or equivalents, manufactured by numerous manufacturers such as Texas Instruments, Motorola, or Signetics.

The data transition pulse 33 is routed through an inverter gate 50 to the "Set" terminal of a standard type D flip flop, FF4, such as the generic TTL 5474, or equivalent. Whenever a data transition pulse occurs, FF4 is thus set. It is reset by a signal labeled 2CLOCK, which signal is twice the frequency of the clock output signal 31. The outputs of FF4 thus constitute a set of complementary pulses which are triggered by a data transition and which terminate at the subsequent edge, clocking or non-clocking, of the clock output signal 31. These complementary pulses comprise the data transition control pulse 35 referred to in connection with FIG. 1, which is directed to the up/down counter 22 and the window counter 18 over signal line 36.

The window counter 18 is also shown in FIG. 2. It includes a synchronous 4 bit counter C3, such as the generic TTL 54193, or equivalent, and convential logic gates G1, G2, G3, G4, G5a and G5b. The counter C3 is reset to zero (that is, a zero is loaded thereinto) at each negative going, or non-clocking, edge of the clock output signal 31. This resetting is accomplished by directing a reset pulse, labeled RESET in the Figures, generated by a one shot M5 (FIG. 3) that is triggered by the negative going edge of the clock output signal 31.

Gates G2, G3, and G4 are combinational gates which enable the counter C3 to be incremented by a clocking signal, and therefore, to begin its timing function, whenever a data transition occurs prior to a clocking edge (gate G2), or whenever a clocking edge occurs prior to a data transition (gate G3). The incrementing clock signal is that clock signal generated in the variable divider 12 that has a frequency equal to one half of that generated by the oscillator 10. This signal is labeled OSC/2 in the figure and is directed to the counter C3 over signal line 25. If the counter C3 reaches its terminal count before being reset, it generates a carry pulse on signal line 52 which sets the latch formed by gates G5a and G5b. The setting of this latch enables gate G1 so that an out-of-window timing pulse may be outputted on signal line 42 at the next edge, negative going or positive going, of the clock output signal 31. The placing of this out-of-window timing pulse at the edges of the clock output signal is achieved by routing a 2CLOCK signal (the inverse of the 2CLOCK signal) through gate G1. As mentioned previously, the 2CLOCK signal is twice the frequency of the clock output signal 31. It (the 2CLOCK signal) is not a symmetrical clock signal, but rather consists of a series of pulses, each pulse lasting for one period of the fixed frequency signal generated by the oscillator 10, and each pulse occuring so that its trailing edge is coincident with the edges of the clock output signal 31. This timing relationship is best illustrated in the timing sequence digrams of FIGS. 4 and 5.

The phase detector 16, as shown in FIG. 2 consists of a D flip flop, FF3, such as the generic TTL 5474 or equivalent. The clock output signal 31 is routed to the D input over signal line 30. The data transition pulse is routed to the clock input of FF3 over signal line 34. Thus connected, FF3 will latch in one state if the clock output signal 31 is low at a data transition (data transition occurs before the clocking edge), and will latch in the opposite state if the clock output signal 31 is high at a data transition (data transition occurs after the clocking edge).

The up/down counter 22, as shown in FIG. 2, consists of a commercially available 4-bit up/down counter C4, such as the generic TTL 54193; control gates G7, G8, and G9; a one shot M3; and a quadruple 2-line-to-1-line multiplexer, such as the generic TTL 54157 or equivalent. Gates G7 and G8 steer the data transition control pulse on line 36 to the proper clock input of the up/down counter C4, so that C4 will count up or count down depending upon the phase relationship between the clocking edge of the clock output signal and the data transition. These gates are controlled by the control signals received from the phase detector 16 over the two-line data bus 38.

The multiplexer M4 is used in the window counter 22 in connection with gate G9 and the one shot M3 to: (1) preset a mid-range count into the up/down counter C4 whenever an UPDATE signal is present, and (2) maintain a maximum count or a minimum count in the counter C4 should the counter ever reach these values. This latter function is necessary in order to preserve the polarity of the count with respect to the initial preset mid-range value.

An UPDATE pulse signal is generated whenever an out-of-window timing pulse is generated by the Window Counter 18 or a terminal count pulse is generated by the K-Counter 20. (See gate G11, inverter 54, and associated signal line in FIG. 3.) The inverse of this signal, $\overline{UPDATE}$, triggers one shot M3 within the window counter 22. M3 may be the same type of one shots as were used for M1 and M2. The pulsed output of M3 is then used to: (1) direct the Multiplexer M4 to select a desired binary number, in this case "1000," to be presented to the parallel inputs of the counter C4, and (2) direct the counter C4 to load this number into itself. In this fashion, a mid-range binary value is preset into the up/down counter C4 at each UPDATE command. Similarly, if the counter C4 should ever reach its maximum count ("1111") or its minimum count ("0000"), then the borrow or carry signals generated when such a maximum or minimum condition occurs are used to re-load these values back into the counter C4 through the multiplexer M4 so that the values are maintained. This "wrap-around" feature thus preserves the polarity of the count with respect to the initial preset value.

The most significant bit of the counter C4, labeled C4-Q3 in the Figures, is used as an output to indicate the status of the up/down counter 22. This bit is sent over signal line 40 to the variable divider 12. Note that this bit is initially set to a "1" when the preset number "1000" is loaded into the counter C4. If the counter C4 is first incremented, indicating the clocking edge leads the data transition, then C4-Q3 remains a "1." If the counter C4 is first decremented, however, indicating the clocking edge lags the data transition, then C4-Q3 changes to a "0." In this fashion, a single bit is used to indicate the status of the up/down counter C4 relative to its initial present value.

FIG. 3 depicts the details of the Variable Divider 12 and the K-counter 20. The details of the oscillator 10 are not shown inasmuch as any suitable oscillator that generates a fixed frequency signal could be used.

The K-counter 20 comprises a 4-bit binary counter C5, such as the generic TTL 54161 or equivalent, that is incremented once every clock output cycle. It is reset to zero by an UPDATE signal, meaning an out-of-window condition exists or the integrating period $T_I$ has expired. Gate G11 is used to generate this UPDATE signal as a function of the out-of-window timing pulse received from the window counter 18 over line 42 or the terminal count pulse generated by the counter C5 when it has reached its terminal count.

The variable divider 12 includes dividing circuitry and m-generating circuitry. The dividing circuitry includes binary counters C1 and C2, flip-flops FF1 and FF2, gate G10, and inverter 56. C1 and C2 are synchronous 4-bit counters, with parallel data entry capability, such as the generic TTL 54161 integrated circuit, or equivalent, manufactured by numerous semiconductor manufacturers. Flip flops FF1 and FF2 are standard D flip flops, such as the generic TTL 5474 or equivalent.

The two counters C1 and C2, and the flip flops FF1 and FF2, are connected in series to realize a 9 bit counter. All but the last bit of this 9 bit counter are clocked by a common clock signal on line 58 by the fixed frequency signal f of the oscillator 10 after this signal has passed through the inverter gate 56. The first bit of the counter C1 provides the OSC/2 signal that is sent to the window counter 18 over line 25.

The binary counters C1 and C2 function in the same manner as previously described binary counters. That is, they count up from an initial value until they reach a terminal value, at which time a carry output or terminal-count pulse is generated. Counter C2 is connected in series with counter C1 so that C2 is incremented only by the carry outputs of counter C1. Gate G10 monitors the carry outputs from both C1 and C2 and causes the D-input to FF1 to go low only when a terminal-count pulse is present from both counters.

The output of FF1 provides the 2CLOCK and $\overline{2CLOCK}$ signals mentioned previously that are used by window counter 18. This 2CLOCK signal is also directed to the clock input of FF2, which is configured to toggle, or change states, at each clock pulse. The output of FF2 is thus a symetrical clock signal that constitutes the clock output signal 31 of the invention.

The frequency of the clock output signal 31 is controlled by changing an eight-bit binary number that is loaded into the counter C1 and C2. This number is preset into the counter with each 2CLOCK signal pulse. As seen in FIG. 3, the five most significant bits of this eight-bit control number are hard-wired to be "10011", while the last 3 bits are controlled by the outputs of gates G13, G14, and G15. These gates and all the circuitry required to generate this eight-bit number, comprise the m-generating circuitry referred to previously.

When gates G13, G14, and G15 are disabled, as is always the case except when an UPDATE signal is present (which only occurs when an out-of-window timing pulse is present or when the K-counter 20 indicates the integration period $T_I$ has timed out) the eight-bit binary number loaded into the counters C1 and C2 is "10011101." Those skilled in the art will recognize that this binary number is the two's complement of 99. Thus, starting at this number, the combined counter comprised of C1 and C2 will reach its maximum count ("11111111") 99 counts later. The effect of FF1 is to add one more count for a total of 100 counts. The effect of FF2 is to divide the output of FF1 by two. The overall effect is to divide f by 200.

If an out-of-window timing pulse causes an UPDATE signal to be present, then gates G13, G14, and G15 are enabled, and the last 3 bits presented to the Counter C1 are a function of the status of the up/down counter 22, or the signal C4-Q3 received over line 40. An analysis of the logic gates shown in FIG. 3 reveals that this number will be "10011011" (the two's complement of 101) if C4-Q3 is a "1", and "10011111" (the two's complement of 97) if C4-Q3 is a "0." With either of these updated values present, the combined counter formed by C1 and C2 will reach its maximum count either two counts later or two counts earlier than it did when no UPDATE condition was present. Thus, the period, and consequently the phase, of the clock output signal 31 will be shifted accordingly.

Similarly, if a terminal count from the K-Counter 20 causes an UPDATE signal to be present, then the eight-bit numbers presented to the combined counter formed by C1 and C2 will be "10011100" (the two's complement of 100) or "10011110" (the two's complement of 98) depending upon whether C4-Q3 is a "1" or "0" respectively. Hence, the combined counter C1 and C2 will reach its maximum count either one count sooner or one count later than it did when no UPDATE condition was present, thus shifting the phase of the clock output signal accordingly.

Figure 4:
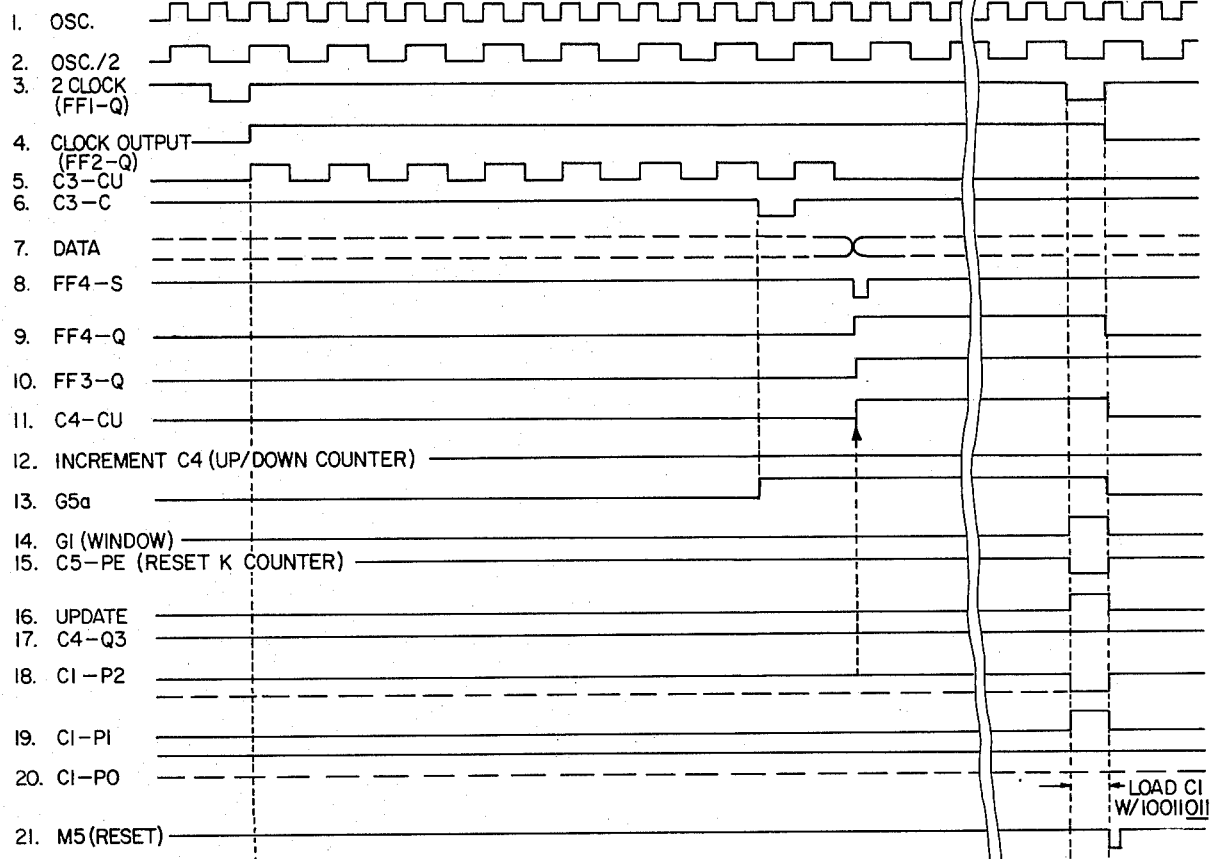
FIG. 4 is a detailed timing diagram that illustrates the timing sequence of selected key signals associated with the operation of the circuitry shown in FIGS. 2 & 3 when a data transition occurs after the clock signal.
Figure 4:
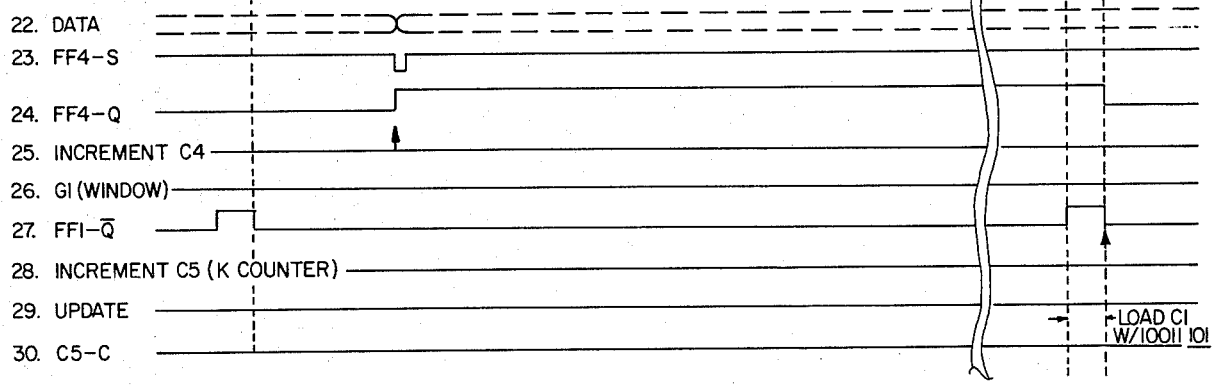

The above description in connection with the circuits of FIGS. 2 and 3 is best understood when studied in connection with an examination of the timing sequence diagrams of FIGS. 4 and 5. These timing sequence diagrams illustrate the timing relationships that exists for selected signals when either an "out-of-window" or "in-window" condition is present. Corresponding labels have been used to inter-relate corresponding signals in the figures. Thus, line 10 of FIG. 4 which is labeled FF3-Q, shows how the Q output of FF3 (FIG. 2) changes relative to other key signals when a data transition occurs after the clocking edge and outside of the window defined by the window counter 18. Similarly, line 24 of FIG. 5, which is labeled FF4-Q, illustrates how the Q output of FF4 (FIG. 2) will change relative to the other key signals when a data transition occurs before the clocking edge and inside of the defined phase window. In this fashion, FIGS. 4 and 5 thus disclose how the key signals associated with the preferred embodiment change as a function of time for the conditions shown.

While the invention herein disclosed has been described by means of a specific embodiment and application thereof, numerous modifications and variations could be made thereto by those skilled in the art without departing from the spirit and scope of the present invention. It is therefore to be understood that within the scope of the appended claims, the invention may be practiced otherwise then as specifically described herein.

What is claimed is:

1. A digital timing recovery system for producing a clock signal in synchronization with received digital data comprising:
   an oscillator for generating a fixed frequency signal;
   clock derivation means coupled to said oscillator for deriving from said fixed frequency signal said clock signal, said clock signal having a frequency that is 1/m of said fixed frequency signal where m is a variable derivation factor, and said clock signal further having a clocking transition that separates one clock cycle from another;
   data transition detector means responsive to said received digital data for detecting data transitions of said received digital data and for generating a data transition pulse coincident with said detected data transition;
   time comparison means coupled to said clock derivation means, oscillator, and said data transition detector means for comparing and measuring the time at which said output data transition pulse occurs with respect to the time at which said clocking transition of said clock signal occurs and for producing error and timing signals in response to the results of said time comparison and measurement; and
   update means coupled to said clock derivation means and responsive to said error and timing signals for increasing the value of m when said data transition occurs after said clocking transition, and for decreasing the value of m when said data transition occurs before said clocking transition, said increase and decrease of m occurring frequently if the time difference between said data transition pulse and said clocking transition is greater than a predetermined time measurement of said time comparison means, and said increase and decrease of m occurring less frequently if the time difference between said data transition pulse and said clocking transition is less than said predetermined time measurement,
   whereby said clock signal quickly synchronizes with said received digital data and smoothly maintains said synchronization thereafter.

2. A timing recovery system as defined in claim 1 wherein said time comparison means comprises:
   a phase detector circuit coupled to said data transition detector and said clock derivation means, said phase detector circuit adapted to detect and signal a first condition when said data transition pulse occurs before said clocking transition of said clock signal, and to detect and signal a second condition when said data transition pulse occurs after said clocking transition; and
   a window counter, coupled to said clock derivation means, oscillator, data transition detector means and phase detector circuit, for determining if said data transition pulse occurs within a predetermined window of time from said clocking transition, said window of time being measured forward and rearward from said clocking transition, and for generating an out-of-window timing signal when said clocking transition does not occur within said window of time.

3. A timing recovery system as defined in claim 2 wherein said update means comprises:
   an up/down counter, coupled to said phase detector circuit and said clock derivation means, adapted to be incremented each time one of said conditions is detected by said phase detector circuit and to be decremented each time the other of said conditions is detected, said counting to begin from an initial, pre-set mid-range count value of said up/down counter and to continue for a prescribed integration time period, said up/down counter further adapted to output an up/down counter status signal to said clock derivation means that indicates the content of said up/down counter after said prescribed integration time period has expired; and
   a resettable K-counter coupled to said clock derivation means, window counter, and said up/down counter for defining said prescribed time period, said K-counter adapted to count a prescribed number of clocking transitions of said clock signal before generating a terminal K-count signal that indicates said prescribed integration time period has elapsed, and said K-counter further adapted to generate an update signal whenever either said terminal K-count signal or said out-of-window timing signal is present, said update signal serving to reset said K-counter.

4. A timing recovery system as defined in claim 3 wherein said up/down counter comprises digital binary up/down counter circuitry adapted to be initialized to an initial binary value whenever said K-counter generates said update signal, said initial binary value being approximately midway between said up/down counter's maximum and minimum count capacity.

5. A timing recovery system as defined in claim 4 wherein said digital binary up/down counter circuitry further includes maximum/minimum count hold circuitry adapted to prevent said up/down counter from incrementing through its maximum number to its minimum number and from decrementing through its minimum number to its maximum number.

6. A timing recovery system as defined in claim 3 wherein said window counter comprises digital binary counter circuitry adapted to be:
 reset to zero in response to a window reset signal received from said clock derivation means;
 enabled in response to said data transition pulse when said first condition exists;
 enabled in response to a clocking transition of said clock signal when said second condition exists;
 incremented by an incrementing signal derived from said fixed frequency signal of said oscillator when enabled; and
 timed out after a prescribed number of incrementing signals have been counted, said timing out causing said counter circuitry to generate an out-of-window timing signal.

7. A timing recovery system as defined in claim 6 wherein said window reset signal comprises a pulsed reset signal generated in response to a non-clocking transition occurring in said clock signal.

8. A timing recovery system as defined in claim 6 wherein said incrementing signal used to increment said window counter comprises said fixed frequency signal divided by two.

9. A timing recovery system as defined in claim 3 wherein said clock derivation means comprises:
 a j-bit binary counter, where j is an integer, adapted to be selectively preset to an initial count value and to be incremented therefrom by said fixed frequency signal of said oscillator until a maximum count has been reached, at which time said j-bit counter outputs a terminal count pulse and enables itself to be selectively preset to a new initial count value; and
 m-generating circuitry coupled to said up/down counter and window counter for defining said initial count value as a function of said up/down counter status signal and said out-of-window timing signal.

10. A timing recovery system as defined in claim 9 wherein said clock derivation means further comprises an output flip flop coupled to said j-bit counter for outputting said clock signal, said output flip-flop adapted to toggle at each occurrence of said terminal count pulse.

11. A timing recovery system as defined in claim 3 wherein said data transition detector means comprises:
 a plurality of monostable multivibrator circuits adapted to generate a pulse of a fixed duration when said monostable multivibrators are triggered, at least one of which is adapted to be triggered by a positive going data transition occuring in said recovered digital data, and at least another of which is adapted to be triggered by a negative going data transition occurring in said received digital data; and
 logic means for combining the pulses of said plurality of monostable multivibrator circuits and producing therefrom a series of output data transition pulses that appear on a single output data transition signal line, each of said data transition pulses being coincident with one of said pulses of fixed duration.

12. A timing recovery system as defined in claim 11 wherein said phase detector circuit comprises digital latching circuitry coupled to said clock signal and said data transition signal line, said digital latching circuitry adapted to be latched in one state if said data transition pulse occurs before said clocking transition of said clock signal and to be latched in an opposite state if said data transition pulse occurs after said clocking transition.

13. A method of recovering a clock signal in synchronization with received digital data comprising the steps of:
 (a) generating a fixed frequency signal having a frequency f;
 (b) dividing the frequency of said fixed frequency signal by a number m to produce a clock signal having a frequency that is f/m, m being a variable number that is selectively chosen so that the resulting f/m frequency of said clock signal is close to the received digital data rate;
 (c) detecting data transitions that occur in said received digital data;
 (d) comparing the phase relationship between said data transition and a clocking edge of said f/m clock signal;
 (e) measuring the time difference between said data transition and said clocking edge to determine if said data transition occurs within a prescribed window of time from said clocking edge, said window of time being measured forward and rearward from said clocking edge;
 (f) increasing m to m+r, where r is a number much less than m, when said data transition occurs after said clocking edge and outside of said window of time, thereby decreasing the frequency of said f/m clock signal to f/(m+r), said decrease in frequency causing subsequent clocking edges of said signal to occur later in time and thus closer to subsequent data transitions;
 (g) decreasing m to m−r when said data transition occurs before said clocking edge and outside of said window of time, thereby increasing the frequency of said clock signal to f/(m−r), said increase in frequency causing subsequent clocking edges of said clock signal to occur earlier in time and thus closer to subsequent data transitions;
 (h) repeating steps (b) through (h) until said data transition occur within said window of time;
 (i) starting an integration time interval that lasts for several clock cycles of said clock signal as soon as said data transition is within said window;
 (j) maintaining said clock frequency at f/m throughout said integration time interval so long as said data transitions continue to occur within said window of time;

(k) counting the net difference between the number of times said data transition leads said clocking edge and the number of times said data transition lags said clocking edge during said integration time interval;

(l) increasing m to m+p, where p is a number less than r, for one clock period if said net difference indicates said data transitions have occurred more often after said clocking edge than before said clocking edge during said integration time interval;

(m) decreasing m to m−p for one clock period if said net difference indicates said data transitions have occurred more often before said clocking edge than after said clocking edge during said integration time interval, said change of m for one clock period in this step and step (l) above above thereby decreasing the time error between said data transition and said clocking edge in the manner described above in step (f) and (g); and (n) repeating steps (i) through (m) so long as said data transitions continue to occur within said window of time, thereby maintaining said clock signal in close synchronization with said received digital data.

* * * * *

UNITED STATES PATENT AND TRADEMARK OFFICE
CERTIFICATE OF CORRECTION

PATENT NO. : 4,280,099
DATED : July 21, 1981
INVENTOR(S) : Glen D. Rattlingourd, and John W. Zscheile Jr.

It is certified that error appears in the above-identified patent and that said Letters Patent are hereby corrected as shown below:

On the title page, add John W. Zscheile Jr., Murray, Utah, as a co-inventor.

Signed and Sealed this

Twelfth Day of January 1982

[SEAL]

Attest:

GERALD J. MOSSINGHOFF

Attesting Officer     Commissioner of Patents and Trademarks